United States Patent
Zhang et al.

(10) Patent No.: US 9,942,820 B2
(45) Date of Patent: Apr. 10, 2018

(54) SYSTEMS AND METHODS FOR CROSS-CELL CARRIER AGGREGATION FOR COVERAGE BALANCE IMPROVEMENT

(71) Applicant: APPLE INC., Cupertino, CA (US)

(72) Inventors: Dawei Zhang, Saratoga, CA (US); Tarik Tabet, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/503,269

(22) Filed: Sep. 30, 2014

(65) Prior Publication Data

US 2015/0156695 A1     Jun. 4, 2015

Related U.S. Application Data

(60) Provisional application No. 61/910,737, filed on Dec. 2, 2013.

(51) Int. Cl.
*H04W 36/30*     (2009.01)
*H04W 24/08*     (2009.01)
(Continued)

(52) U.S. Cl.
CPC .............. *H04W 36/30* (2013.01); *H04L 5/001* (2013.01); *H04W 24/08* (2013.01); *H04L 5/006* (2013.01);
(Continued)

(58) Field of Classification Search
CPC ............................. H04W 36/30; H04W 24/08
(Continued)

(56) References Cited

U.S. PATENT DOCUMENTS

| | | | |
|---|---|---|---|
| 8,442,539 B2 * | 5/2013 | Li | H04W 52/0216 455/419 |
| 8,588,787 B2 * | 11/2013 | Murakami | H04W 36/245 370/331 |

(Continued)

FOREIGN PATENT DOCUMENTS

| | | |
|---|---|---|
| CN | 103188663 | 7/2013 |
| JP | 2013-534792 | 9/2013 |

(Continued)

OTHER PUBLICATIONS

Kengo Yagyu, A Study on Management Technique of Carrier Aggregation in LTE-Advanced, IEICE Technical Report vol. 110 No. 433, Japan, The Institute of Electronics, Information and Communication Engineers (IEICE), Feb. 3, 2011, vol. 110, pp. 145-150 (Feb. 3, 2011).

*Primary Examiner* — Cong Tran
(74) *Attorney, Agent, or Firm* — Fay Kaplun & Marcin, LLP

(57) ABSTRACT

A system and methods that are performed by a macro cell and a user equipment (UE) to implement a carrier aggregation mode in a network. The system includes a macrocell including a first coverage area and a plurality of small cells, each of the small cells including a second coverage area wherein the plurality of second coverage areas substantially cover the first coverage area. The macro cell operates a first component carrier as a primary component carrier in a carrier aggregation enabled network and one of the small cells operates a second component carrier as a secondary component carrier in the carrier aggregation enabled network.

17 Claims, 7 Drawing Sheets

Method 700

(51) Int. Cl.
*H04L 5/00* (2006.01)
*H04W 84/04* (2009.01)
*H04W 24/10* (2009.01)
*H04W 36/38* (2009.01)
*H04W 72/04* (2009.01)
*H04W 72/08* (2009.01)

(52) U.S. Cl.
CPC ........... *H04L 5/0098* (2013.01); *H04W 24/10* (2013.01); *H04W 36/38* (2013.01); *H04W 72/0426* (2013.01); *H04W 72/085* (2013.01); *H04W 84/042* (2013.01)

(58) Field of Classification Search
USPC .......... 455/450, 436–439, 422.1, 424, 432.2, 455/550.1, 552.1, 435.2; 370/331–332, 370/329
See application file for complete search history.

(56) References Cited

U.S. PATENT DOCUMENTS

| | | | | |
|---|---|---|---|---|
| 8,787,194 | B2* | 7/2014 | Yang | H04L 27/261 370/252 |
| 9,008,046 | B2 | 4/2015 | Jung et al. | |
| 9,204,308 | B2* | 12/2015 | Hamalainen | H04W 16/14 |
| 9,451,533 | B2* | 9/2016 | Ren | H04W 48/16 |
| 2011/0013600 | A1* | 1/2011 | Kim | H04L 5/0085 370/332 |
| 2012/0014357 | A1 | 1/2012 | Jung et al. | |
| 2012/0302245 | A1 | 11/2012 | Huang | |
| 2013/0065585 | A1* | 3/2013 | Pelletier | H04W 4/02 455/435.1 |
| 2013/0079003 | A1* | 3/2013 | Nagaraja | H04W 24/02 455/435.1 |
| 2013/0215772 | A1 | 8/2013 | Kaur et al. | |
| 2013/0294383 | A1* | 11/2013 | Zhang | H04L 5/001 370/329 |
| 2014/0092785 | A1* | 4/2014 | Song | H04L 1/00 370/280 |
| 2014/0213310 | A1* | 7/2014 | Yeh | H04W 72/08 455/501 |
| 2014/0308921 | A1 | 10/2014 | Zhang | |
| 2014/0328228 | A1* | 11/2014 | Park | H04B 7/2615 370/280 |
| 2014/0349701 | A1* | 11/2014 | Vajapeyam | H04W 52/32 455/522 |
| 2014/0369313 | A1* | 12/2014 | Li | H04W 36/0033 370/331 |
| 2015/0009922 | A1* | 1/2015 | Hoshino | H04L 5/0053 370/329 |
| 2015/0181593 | A1* | 6/2015 | Kim | H04W 52/0216 370/329 |
| 2015/0215962 | A1* | 7/2015 | Mizusawa | H04W 16/16 370/280 |
| 2015/0230236 | A1* | 8/2015 | Zeng | H04L 41/0806 370/329 |
| 2016/0036541 | A1* | 2/2016 | Siomina | H04B 17/345 455/422.1 |
| 2016/0050652 | A1* | 2/2016 | Wu | H04L 5/001 370/329 |
| 2016/0192269 | A1* | 6/2016 | Kim | H04W 36/30 370/332 |

FOREIGN PATENT DOCUMENTS

| | | |
|---|---|---|
| WO | 2011/085195 | 7/2011 |
| WO | 2011/101543 | 8/2011 |
| WO | 2012/113449 | 8/2012 |
| WO | 2012/116489 | 9/2012 |
| WO | 2013/040487 | 3/2013 |
| WO | 2013/104416 | 7/2013 |

* cited by examiner

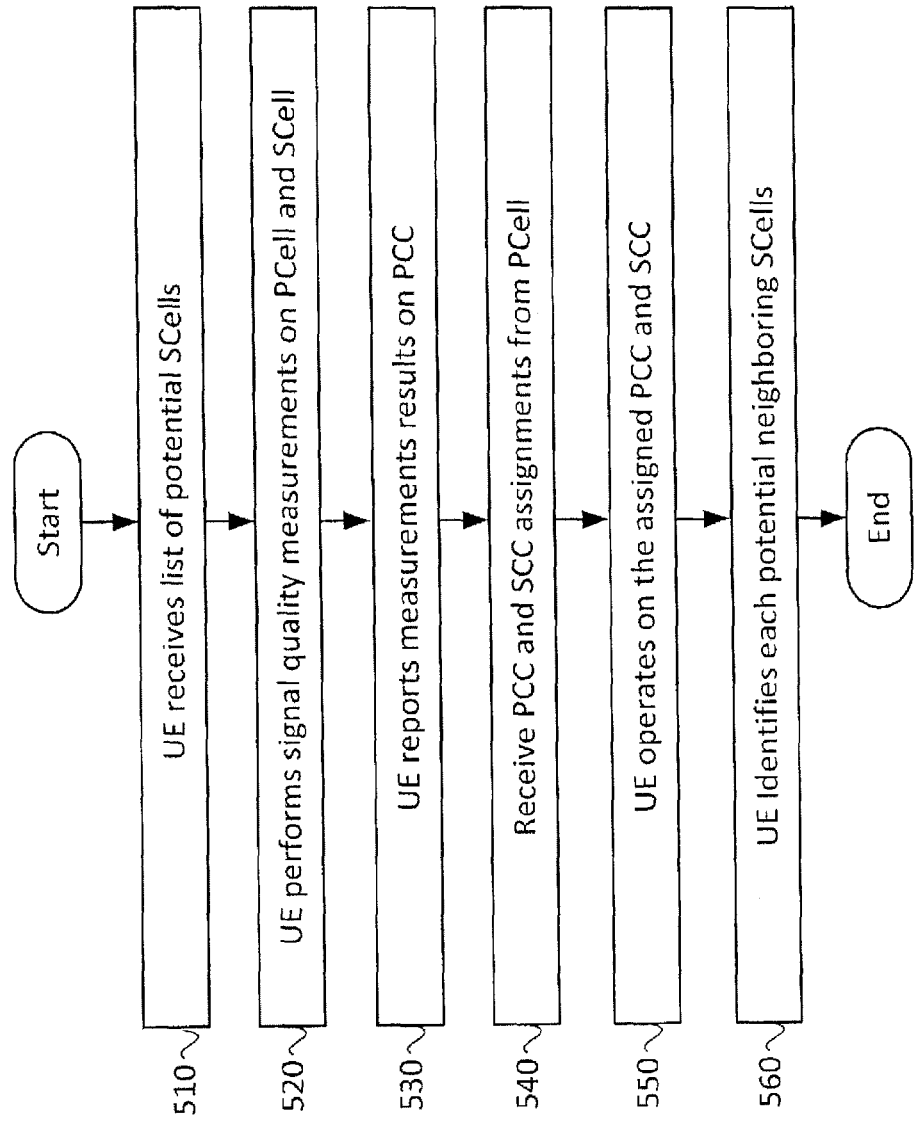

Measurement Object 600

```
SCellToAddMod-r10 ::=           SEQUENCE {
    sCellIndex-r10                  sCellIndex-r10,
    cellIndentification-r10         SEQUENCE {
        physCellId-r10                  PhysCellId,
        dl-CarrierFreq-r10              ARFCN-ValueEUTRA
    }                                                           OPTIONAL,       -- Cond SCellAdd
    radioResourceConfigCommonSCell-r10      RadioResourceConfigCommonSCell-r10      OPTIONAL,   -- Cond
SCellAdd
    radioResourceConfigDedicatedSCell-r10   RadioResourceConfigDedicatedSCell-r10   OPTIONAL,   --
Cond SCellAdd2
}
    . . .
```

Fig. 6

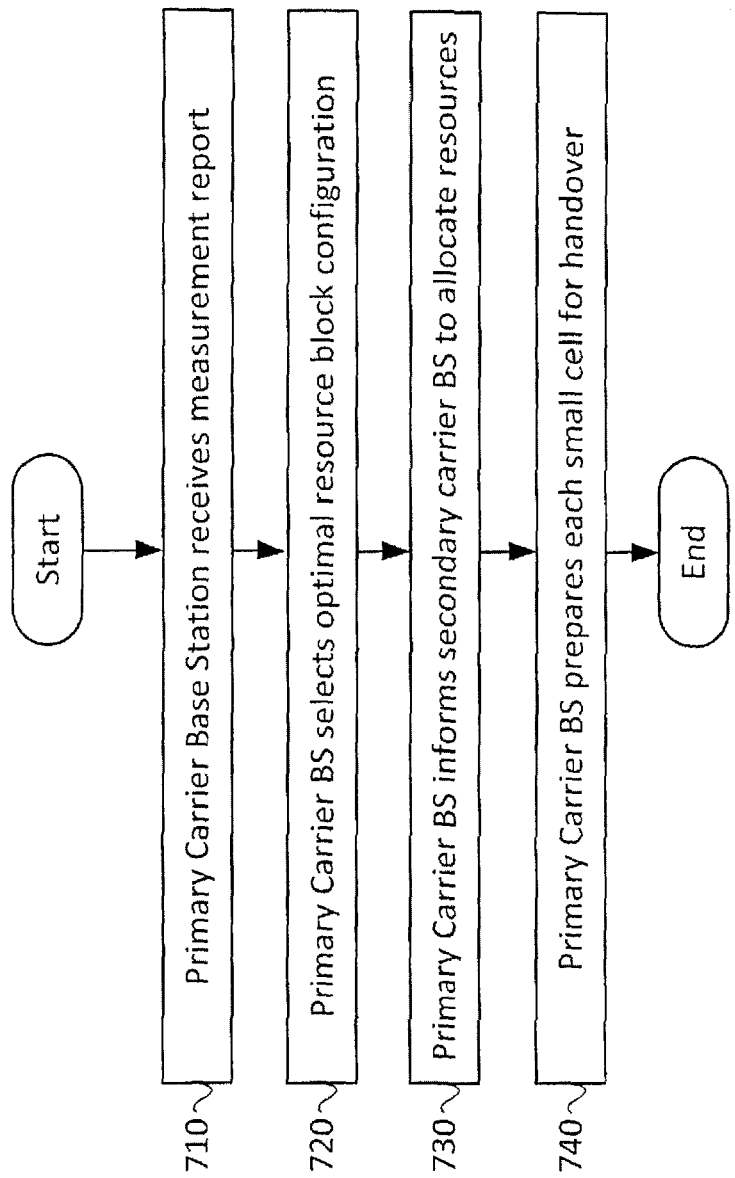

SYSTEMS AND METHODS FOR CROSS-CELL CARRIER AGGREGATION FOR COVERAGE BALANCE IMPROVEMENT

PRIORITY CLAIM/ INCORPORATION BY REFERENCE

This application claims priority to U.S. Provisional Application 61/910,737 entitled "Systems and Methods for Cross-Cell Carrier Aggregation for Coverage Balance Improvement," filed on Dec. 2, 2013, the entirety of which is incorporated herein by reference.

BACKGROUND

Long-term evolution ("LTE") is a wireless communication standard used for high-speed data for mobile devices and data terminals. LTE-Advanced is a major enhancement to the LTE standard. Within the LTE-Advanced standard, carrier aggregation is used to increase the bandwidth, and thereby increase the bitrates. Carrier aggregation has been introduced in the 3rd Generation Partnership Project ("3 GPP") Release 10 (LTE-Advanced standard) to provide wider than 20 MHz transmission bandwidth to a single device (e.g., user equipment or "UE") while maintaining the backward compatibility with legacy UEs. Specifically, carrier aggregation may be defined as the aggregation of two or more component carriers in order to support wider transmission bandwidths. Carrier aggregation configuration may be defined as a combination of carrier aggregation operating bands, each supporting a carrier aggregation bandwidth class by a UE. The bandwidth class may be defined by the aggregated transmission bandwidth configuration and maximum number of component carriers supported by a UE.

For intra-band contiguous carrier aggregation, a carrier configuration may be a single operating band supporting a carrier aggregation bandwidth class. For each carrier aggregation configuration, requirements may be specified for all bandwidth combinations contained within a bandwidth combination set, as indicated by the radio access capabilities of the UE. Accordingly, a UE may indicate support of several bandwidth combination sets for each band combination.

Under the current standards, each aggregated carrier is referred to as multiple component carriers, wherein each component carrier can have a bandwidth of 1.4, 3, 5, 10, 15 or 20 MHz and a maximum of five component carriers can be aggregated. The multiple component carriers are from a single base station section and a single UE. As illustrated in FIG. 1, two exemplary component carriers may each have a bandwidth of 10 MHz to combine for a total bandwidth of 20 MHz. In LTE-Advance carrier aggregations, two frequency carrier having different frequencies may be bundled together to enhance a peak throughput from a single UE. All of the control and signaling may be transmitted on a primary carrier, while the secondary carrier may be limited to handling the data channel. With carrier aggregation features enabled, the LTE-Advanced standard device supporting 20 MHz carrier aggregation may achieve downlink ("DL") throughput of 100 Mbps.

SUMMARY

Described herein are systems and methods for cross-cell carrier aggregation for improved coverage balance. A an exemplary system includes a macrocell including a first coverage area and a plurality of small cells, each of the small cells including a second coverage area wherein the plurality of second coverage areas substantially cover the first coverage area. The macrocell operates a first component carrier as a primary component carrier in a carrier aggregation enabled network and one of the small cells operates a second component carrier as a secondary component carrier in the carrier aggregation enabled network.

Further described herein is a method performed at a user equipment ("UE") utilizing a plurality of component carriers including a primary component carrier and a secondary component carrier. The method includes performing signal quality measurements for a primary cell and a plurality of secondary cells, generating a measurement results report including the signal quality measurements, transmitting the measurement results report from the UE to the primary cell and operating in a carrier aggregation mode with a first component carrier served by the primary cell as a primary component carrier and a second component carrier served by the one of the secondary cells as a secondary component carrier.

Further described herein is a method performed by a base station of a network that is configured to operate in a carrier aggregation mode, the base station operating as a primary cell. The method including receiving a measurement results report from a user equipment (UE), wherein the measurement results report includes signal quality measurements for the primary cell and a plurality of secondary cells, selecting an optimal configuration of a primary component carrier served by the primary cell and a secondary component carrier served by one of the secondary cells for the UE based on the signal quality measurements and sending the optimal configuration to the UE.

DESCRIPTION OF THE DRAWINGS

FIG. 5 shows an exemplary method for implementing cross-cell carrier aggregation from a UE according to the embodiments described herein.

FIG. 6 shows an exemplary measurement object provided by the UE according to the embodiments described herein.

FIG. 7 shows an exemplary method for implementing cross-cell carrier aggregation from a base station according to the embodiments described herein.

DETAILED DESCRIPTION

Figure 1:
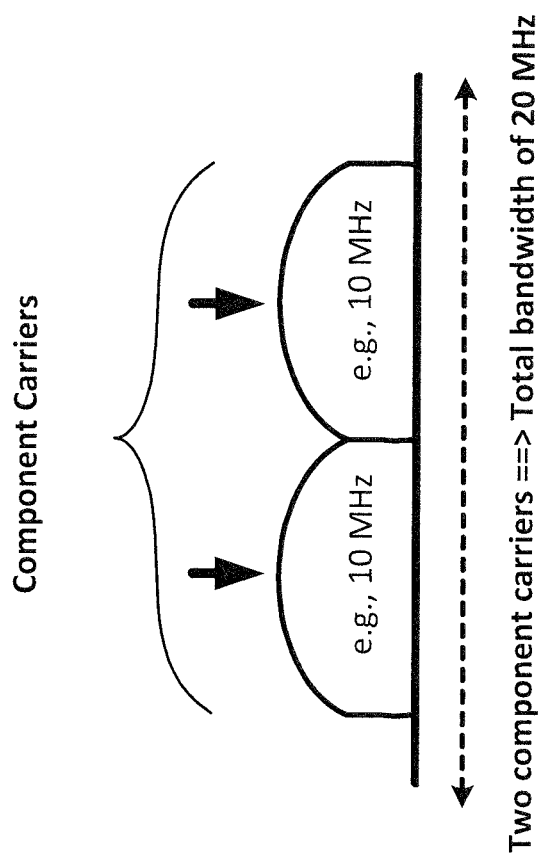
FIG. 1 (discussed above) shows an example of carrier aggregation including two component carriers each having a bandwidth of 10 MHz for a total bandwidth of 20 MHz.

The exemplary embodiments may be further understood with reference to the following description and the appended drawings, wherein like elements are referred to with the same reference numerals. The exemplary embodiments show systems and methods for cross-cell carrier aggregation for improved coverage balance. More specifically, as opposed to using carrier aggregation through a single base station selection, the exemplary embodiments described herein may utilize cross-cell carrier aggregation. Cross-cell carrier aggregation may be defined as having a primary carrier being from one base station (e.g., a macrocell) and a secondary carrier being from another base station (e.g., a femtocell).

When carrier aggregation is used, there may be a number of serving cells for each of the component carriers. The coverage of the serving cells may differ due to both component carrier frequencies and power planning, which is useful for heterogeneous network planning. A radio resource control ("RRC") connection is handled by one cell, namely the primary serving cell ("PCell"), served by the primary component carrier ("PCC") for uplink ("UL") and downlink ("DL").

The other component carriers may be referred to as secondary component carriers ("SCC") for uplink (UL) and downlink (DL), serving the secondary serving cells ("SCells"). The SCCs are added and removed as required, while the PCC is changed at handover. Those skilled in the art will understand that the PCell and SCells are logical constructs allowing for the addition of SCells as needed. The PCell is the main cell that is used for all RRC signaling and control procedures, while the SCell is considered an augmentation to the PCell.

As noted above, LTE-Advance carrier aggregation is currently defined as multiple carriers from a single base station section and a single UE. In many cases, the frequencies of the primary carrier and the secondary carrier may be very different. For instance, a typical frequency for a primary carrier may be 700 MHz, while a typical frequency for a secondary carrier may be 5.8 GHz. This large difference in frequency results in a significant coverage difference between two bundled carriers. Accordingly, this often leads to problems of coverage imbalance between the bundled carriers, and thereby diminishes any of the benefits of carrier aggregation. The exemplary embodiments are described with reference to LTE carrier aggregation. However, it should be noted that the exemplary embodiments may also be implemented within any network that is capable of carrier aggregation.

Figure 2:
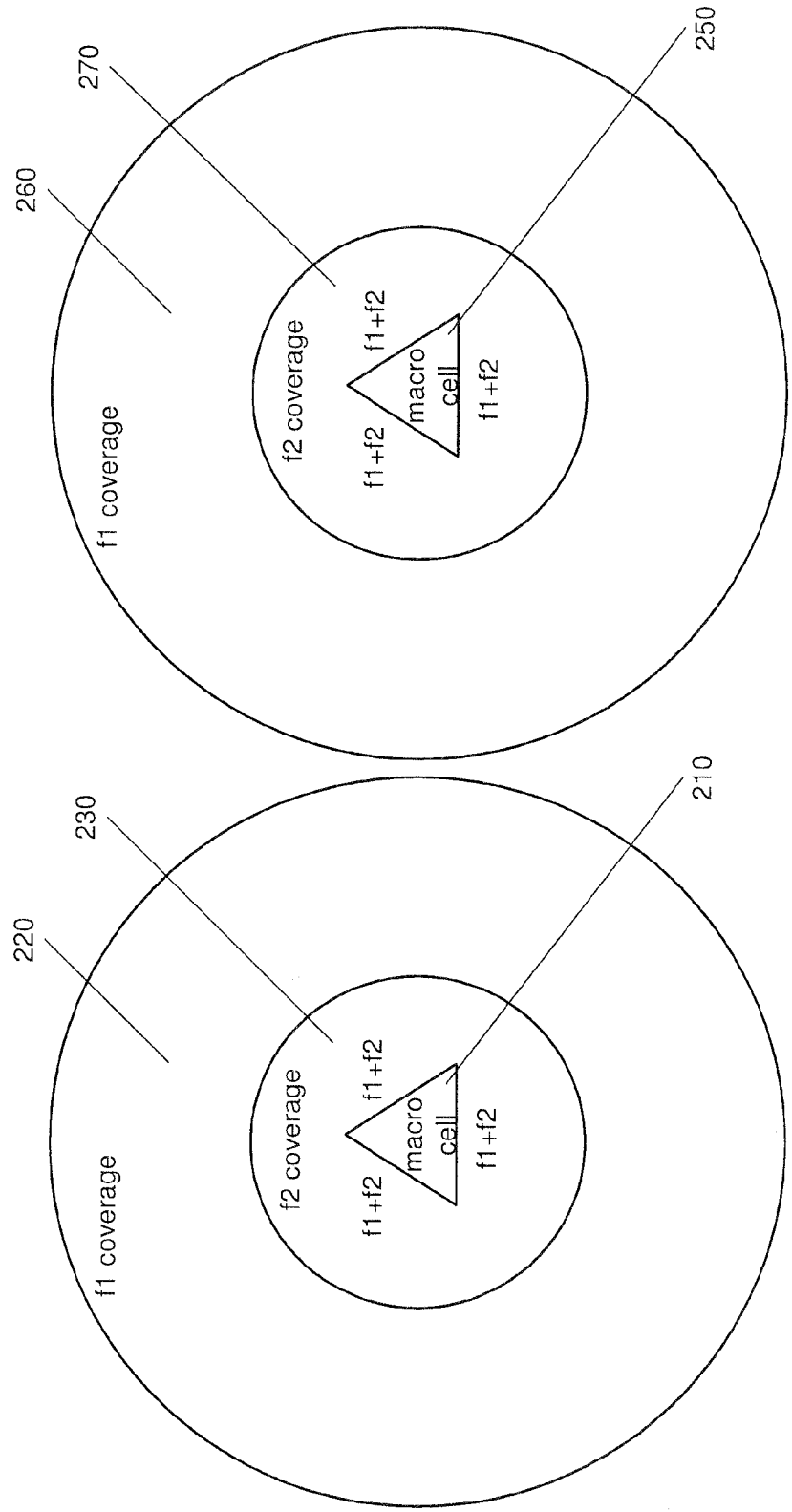
FIG. 2 shows an example of a network arrangement including two macro cells each having two component carriers with different coverage areas according to the embodiments described herein.

FIG. 2 shows a configuration 200 of current LTE-Advance carrier aggregation including two macro cells 210 and 250, each having two component carriers with different frequencies f1 and f2 and including different coverage areas. Specifically, each of the two macro cells 210 and 250 includes a primary carrier and a secondary carrier. The f1 frequency of macro cells 210 and 250 is shown as having a coverage area 220, 260, respectively and represents the primary carrier. The f2 frequency of macro cells 210 and 250 is shown as having a coverage area 230, 270, respectively and represents the secondary carrier. Due to the large discrepancy between the f1 coverage area 220, 260 and the f2 coverage area 230, 270, a UE accessing either of the macro cells 210, 250 will have very limited use of carrier aggregation. For instance, the UE may only be able to utilize carrier aggregation while within the coverage areas where the f1 coverage area 220, 260 overlaps the f2 coverage area 230, 270 i.e., the coverage areas 230, 270 (f1 +f2) of the macro cells. Once the UE travels outside of the overlapping coverage areas 230, 270 (f1+f2), the UE will lose the benefit of the secondary cell for carrier aggregation. Accordingly, the current LTE-Advance carrier aggregation results in coverage imbalance among the macro cells. The macro cells 210 and 250 may be enhanced Node Bs (eNBs) of an LTE carrier aggregation enabled network.

According to an exemplary embodiment described herein, cross-cell carrier aggregation allows for the primary carrier base station to be separated from the secondary carrier base station. Such separation between the base stations may permit a much more dense base station deployment for higher frequency carriers over the low frequency carriers. Accordingly the resulting configuration may thus provide improved coverage balance between the aggregated carriers.

The exemplary systems and methods described herein may be especially useful within the conditions depicted in FIG. 2, wherein the primary carrier is a low frequency LTE band (e.g., 700 MHz) under macro cell deployment and the secondary carriers are located in frequencies in multiple GHz bands under femto cell deployment.

Figure 3:
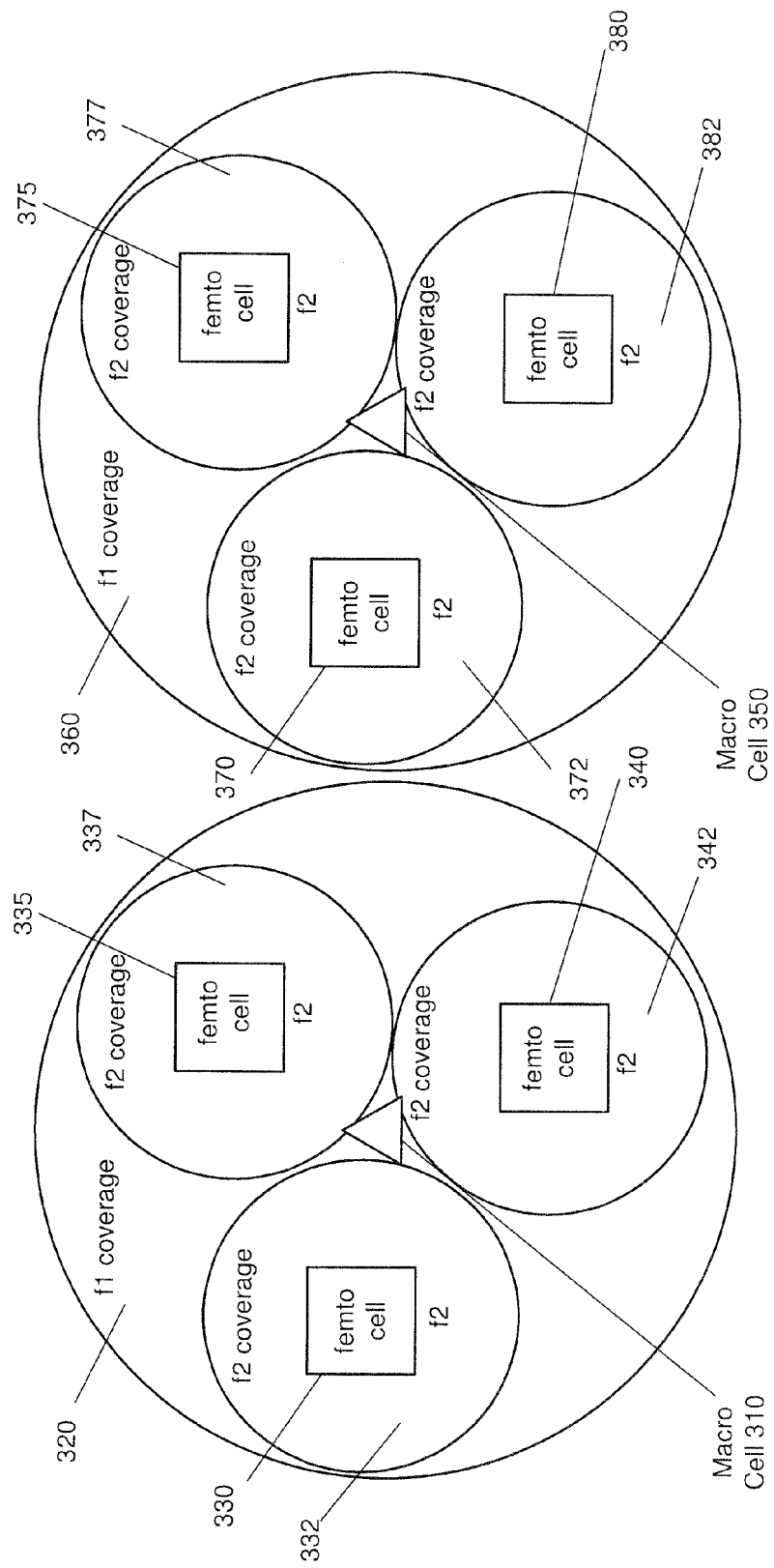
FIG. 3 shows an exemplary network configuration having cross-cell carrier aggregation according to the embodiments described herein.

FIG. 3 shows a network configuration 300 of LTE-Advance carrier aggregation utilized with the exemplary systems and methods for cross-cell carrier aggregation. As opposed to the single macro cell base station sector serving as the two component carriers, as depicted in FIG. 2, the network configuration 300 of FIG. 3 includes multiple smaller femto cell base stations that are separate from the macro cell base station. For instance, while the f1 coverage of the macro cells may remain unchanged, each of the smaller femto cells may have a coverage of f2 within the f1 coverage.

The network configuration 300 has two macro cells 310 and 350 having a f1 coverage area 320 and 360, respectively. These f1 coverage areas 320 and 360 are substantially the same as the f1 coverage areas 220 and 260 described for the network configuration 300. However, in this example, each macro cell 310, 350 have corresponding femtocells 330, 335, 340 and 370, 375 and 380, respectively. Each of these femtocells 330, 335, 340 and 370, 375 and 380 has a corresponding f2 coverage area 332, 337, 342, 372, 377, 382, respectively. Each of these f2 coverage areas 332, 337, 342, 372, 377, 382 may cover substantially the same area as the f2 coverage areas 230, 270 of the network configuration 200.

By including the plurality of femto cells 330, 335, 340, 370, 375, 380 within the f1 coverage areas 320, 360 of the macro cells 310, 350, respectively, a great portion of the f1 coverage areas 320, 360 may provide the UE with the combined coverage frequency of f1+f2. In other words, the carrier aggregation coverage balance of the network configuration 300 in FIG. 3 is greatly improved over the coverage balance illustrated in FIG. 2. In addition, as shown in FIG. 3, the coverage frequencies f1 and f2 remain the same. That is, the network configuration does not require additional frequencies to be used to provide the substantially overlapped coverage areas. It should be noted that while the network configuration 300 depicted in FIG. 3 shows three femto cells within each of the macro cells f1 coverage area, one skilled in the art will understand that any number of smaller separate femto cells may be deployed with the macro cells. It should also be noted that while the smaller cells are described as femtocells, the smaller or secondary cells may be any type of smaller cell, e.g., picocells.

Figure 4:
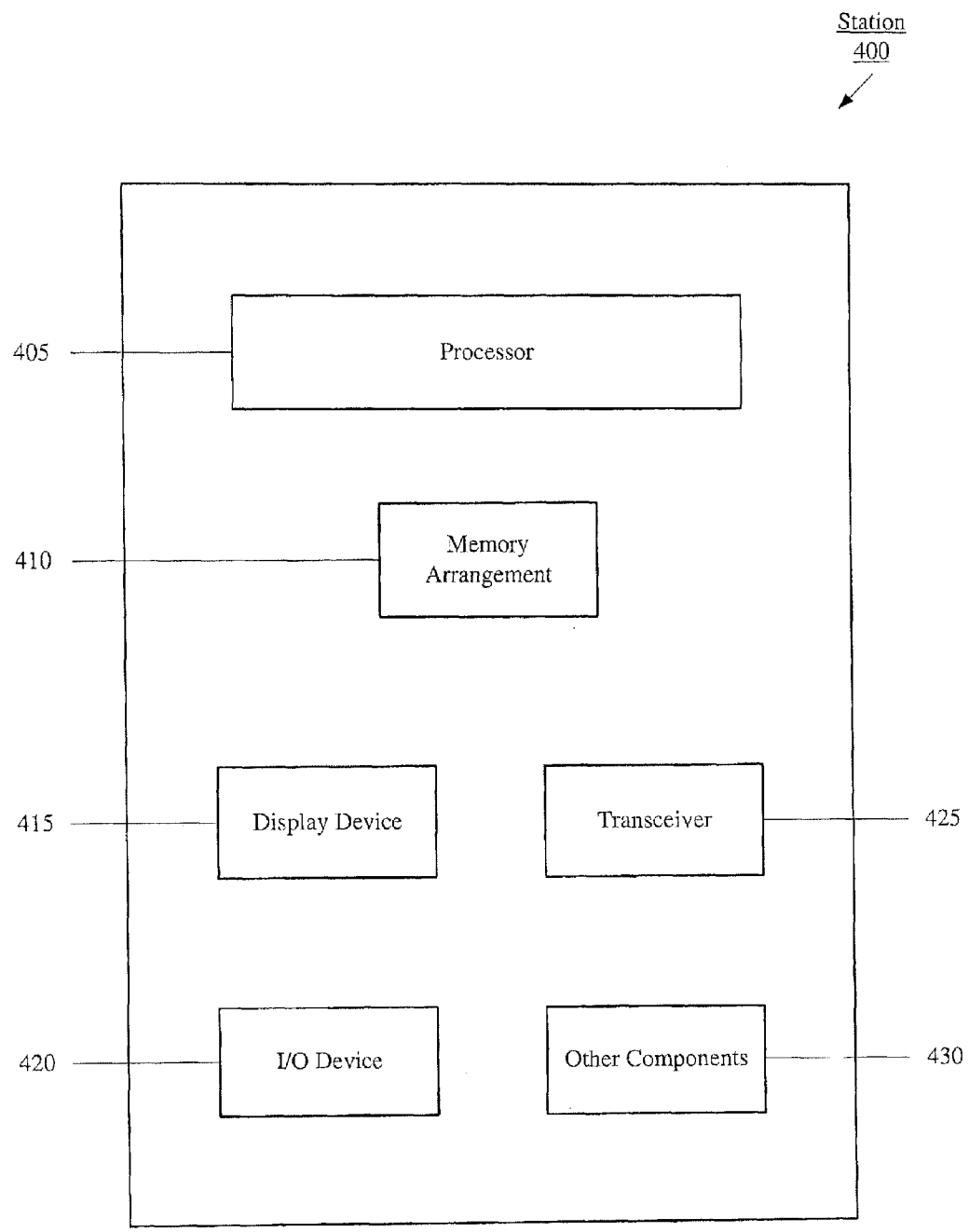
FIG. 4 shows an exemplary user equipment (UE) that is configured to operate in carrier aggregation mode within the network arrangement of FIG. 3.

FIG. 4 shows an exemplary user equipment (UE) 400 that is configured to operate in carrier aggregation mode within the network arrangement 300. The UE 400 may represent any electronic device that is configured to perform wireless functionalities, specifically carrier aggregation functionalities. For example, the UE 400 may be a portable device such as a phone, a smartphone, a tablet, a phablet, a laptop, etc. In another example, the UE 400 may be a stationary device such as a desktop terminal. The UE 400 may include a processor 405, a memory arrangement 410, a display device 415, an input/output (I/O) device 420, a transceiver 425, and other components 430. The other components 430 may include, for example, an audio input device, an audio output device, a battery, a data acquisition device, ports to electrically connect the UE 200 to other electronic devices, etc.

The processor 405 may be configured to execute a plurality of applications of the station 400. For example, the applications may include a web browser when connected to a communication network via the transceiver 425. In a specific exemplary embodiment, the processor 405 may execute a carrier aggregation application. The UE 400 is capable of operating in a carrier aggregation mode and a single carrier mode. The carrier aggregation application allows the UE 400 to operate within the network arrangement 300.

The transceiver 425 may be a hardware component configured to transmit and/or receive data. That is, the transceiver 425 may enable communication with other electronic devices directly or indirectly through the network based upon the operating frequencies of the network. In carrier aggregation modes, the transceiver 425 allows the UE 400 to communicate with both the primary cell and the secondary cell.

It should be noted that the processor 405 performing the functionality described herein for the carrier aggregation application is only exemplary. For example, the transceiver 425 may also perform some or all of the functionality of the carrier aggregation application. In a further example, a separate integrated circuit that may or may not include firmware may perform the functionality of the carrier selection application.

FIG. 5 shows an exemplary method 500 for implementing cross-cell carrier aggregation by the UE 400 when connected to the network arrangement 300 according to the embodiments described herein. Accordingly, the entirety of the method 500 may be performed by the UE 400. The method 500 will also be described with reference to the UE 400 being within the f1 coverage area 320 of the macro cell 310 of the network arrangement 300.

In step 510, the UE 400 receives a list of potential secondary cells from the macrocell 310. FIG. 6 shows an exemplary measurement object 600 provided to the UE 400 that includes the list of the potential secondary cells. In this example, the list will include the femtocells 330, 335 and 340, the potential SCells for the macro cell 310. It should be noted that the macro cell 310 may have communications with the femtocells 330, 335 and 340 and will know that these femtocells 330, 335 and 340 are available as SCells. The macrocell 310 may then provide this information to the UE 400 to simplify the measurements to be made by the UE 400. This list of potential SCells may be provided to the UE 400, for example, by the UE 400 receiving a measurement object 600 as shown in FIG. 6. The measurement object 600 may be an RRC object that is received from the macro cell 310. For example, the list of potential SCells may be added to RRC IE ScellToAddMod-r10, which is an information element (IE) of the LTE standard. The list may include all the potential SCells using a coverage frequency of f2, as depicted in the network configuration 300 of FIG. 3. Other information that may be included in the list is the Cell-IDs of the potential SCells, the absolute radio-frequency channel numbers ("ARFCNs"), etc.

In step 520, the UE 400 that is capable of utilizing a plurality of component carriers may perform signal quality measurements on both a primary component carrier and the secondary component carriers. Specifically, the UE 400 may perform the signal quality measurements for the primary component carrier. The UE 400 may further perform the signal quality measurements for each of the potential SCells. Examples of signal quality measurements may include Reference Signal Received Power (RSRP) and Reference Signal Received Quality (RSRQ). However, any type of signal quality measurement may be used. As described above, the UE 400 received the list of potential SCells from the primary cell, including the cell IDs and frequency list. Thus, the UE 400 is aware of which potential SCells for which the signal quality measurements should be made. To carry through with the example of the UE 400 being in the f1 coverage area 320 of the macro cell 310, the signal quality measurements for the primary cell will result in the measurements for the macro cell 310 operating on the frequency f1. Similarly, the signal quality measurements for the secondary cells will result in the measurements for the femtocells 330, 335, 340 operating on the f2 frequency.

In step 530 the UE 400 may report the measurement results on the primary component carrier to the primary cell, e.g., the macro cell 310. For instance, the UE 400 may utilize a UL control channel (e.g., a Physical Uplink Control Channel (PUCCH)) to report the measurement results. These measurement results may provide an indication to the primary base station (e.g., macro cell 310) to select the most optimal resource usage on the primary and secondary carriers. For example, the f1 frequency of the macro cell 310 may be selected as the primary component carrier and the f2 frequency of the femtocell 330 may be selected as the secondary component carrier based on the measurement results.

In step 540, the UE 400 will receive the primary component carrier and secondary component carrier from the primary base station (e.g., macro cell 310). As described above, the assignments are made by the macro cell 310 based on the signal quality measurements provided by the UE 400 to the macro cell 310. In step 550, the UE 400 operates in the carrier aggregation mode using the assigned primary component carrier and secondary component carrier.

In step 560, for the purpose of secondary cell handovers, the UE 400 is aware of the potential SCells using the coverage frequency of f2. As described above, the UE 400 receives the list of potential secondary cells and is therefore aware of the potential SCells to which the UE 400 may be handed over. For example, the UE 400 will be aware of the femtocells 335 and 340 to which the UE 400 may be handed over to as the secondary component carrier. Thus, if the UE 400 is instructed to perform a handover to one of the other SCells and the handover fails, the UE 400 may attempt to connect to another SCell in its list of potential SCells.

FIG. 7 shows an exemplary method 700 for implementing cross-cell carrier aggregation from a base station according to the embodiments described herein. The method 700 will be described with reference to the macro cell 310 of the network arrangement 300. The entirety of method 700 may be performed by the primary base station (e.g., the macro cell 310).

In step 710, the primary carrier base station (e.g., macro cell 310) may receive the measurement report from the UE 400. An exemplary measurement report and the type of information included in the information report were described above.

In step 720, the macro cell 310 may select an optimal resource block configuration for the primary component carrier and the secondary component carrier. This selection of the primary component carrier and the secondary component carrier is based on the measurement report received from the UE. Carrying through with the example started above, the macro cell 310 may select the f1 frequency of the macro cell 310 as the primary component carrier and the f2 frequency of the femtocell 330 as the secondary component carrier.

In step 730, the macro cell 310 may inform the secondary carrier base station (e.g., the femtocell 330 in the example started above) to allocate the appropriate resource configuration for the data channel transmission to the UE 400. According to one embodiment, the cross-base station signaling (e.g., the signaling between the macro cell 310 and the femtocell 330) may be achieved via a message through a defined X-2 interface between the base stations. For instance, the interface may be similar to a COMP signaling between LTE base stations.

In step 740, for secondary cell handovers, the macro cell 310 may prepare each of the femtocells 330, 335, 340 for handovers based on the measurement report received from the UE 400. For instance, if a handover to a preferred femtocell as indicated by the RRC message fails, the UE 400 may be directed to try another cell in its list of femtocells. The list of femtocells may be, for example, ordered based on the respective signal strengths as measured by the UE 400. This preparation process may simplify the handover in the case of high mobility of the UE 400.

The exemplary embodiments are described with reference to the LTE-Advanced carrier aggregation scheme that has certain characteristics. For example, in frequency-division duplexing ("FDD"), the characteristics include that the number of aggregated carriers may be different in DL and UL, typically, the number of UL component carriers is equal to or lower than the number of DL component carriers. In addition, the individual component carriers may also be of different bandwidths. Alternatively, when time division duplexing ("TDD") is used, the number of component carriers and the bandwidth of each component carrier are the same for DL and UL. However, those skilled in the art will understand that the exemplary embodiments may be applied to any carrier aggregation scheme including those having different characteristics from the LTE-Advanced scheme.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A system, comprising:
   a macrocell including a first coverage area; and
   a plurality of small cells, each of the small cells including a second coverage area wherein the plurality of second coverage areas substantially cover the first coverage area,
   wherein the macrocell and the plurality of small cells operate in carrier aggregation mode, the macrocell operating a first component carrier as a primary component carrier and one of the small cells operating a second component carrier as a secondary component carrier;
   wherein the macrocell receives a measurement report from a user equipment (UE), wherein the measurement report includes signal quality measurements for the macrocell and the plurality of small cells;
   wherein the macrocell assigns a first frequency of the macro cell as the primary component carrier and a second frequency of the one of the small cells as the secondary component carrier based on the measurement report;
   wherein the macrocell transmits a list of potential small cells to the UE, the list being based on a coverage area associated with the second frequency.

2. The system of claim 1, wherein the macrocell is an evolved Node B (eNB) of an LTE network and the small cells are one of femtocells and picocells of an LTE network.

3. The system of claim 1, wherein the first component carrier and the second component carrier allow for cross-cell carrier aggregation.

4. A method, comprising:
   at a user equipment ("UE") utilizing a plurality of component carriers including a primary component carrier and a secondary component carrier:
   performing signal quality measurements for a primary cell and a plurality of secondary cells;
   generating a measurement results report including the signal quality measurements;
   transmitting the measurement results report from the UE to the primary cell;
   receiving an assignment of a first frequency of the primary cell as the primary component carrier and a second frequency of the one of the secondary cells as the secondary component carrier from the primary cell, wherein the primary component carrier and the secondary component carrier are assigned based on the measurement report;
   receiving a list of potential secondary cells, the list being based on a coverage area associated with the second frequency; and
   operating in a carrier aggregation mode with a first component carrier served to the UE by the primary cell as the primary component carrier and a second component carrier served to the UE by the one of the secondary cells as the secondary component carrier.

5. The method of claim 4, further comprising:
   receiving a list of the plurality of secondary cells, wherein the UE performs the signal quality measurements on the secondary cells based on the list.

6. The method of claim 5, wherein the list includes a cell ID and absolute radio-frequency channel numbers for each of the secondary cells.

7. The method of claim 5, further comprising:
   performing a handover procedure to switch to a third component carrier served by a second one of the secondary cells as the secondary component carrier.

8. The method of claim 7, further comprising:
   performing, when the handover procedure fails, a further handover procedure to a fourth component carrier served by a third one of the secondary cells, wherein the third one of the secondary cells is selected for the further handover procedure based on the list of secondary cells.

9. The method of claim 4, wherein the primary cell is an evolved Node B (eNB) of a Long Term Evolution (LTE) network.

10. The method of claim 4, wherein the secondary cells are one of femtocells and picocells of an LTE network.

11. A method, comprising:
    at a base station of a network that is configured to operate in a carrier aggregation mode, the base station operating as a primary cell:
    receiving a measurement results report from a user equipment (UE), wherein the measurement results report includes signal quality measurements for the primary cell and a plurality of secondary cells, wherein the secondary cells are one of femtocells and picocells of an LTE network;

selecting a configuration of a first frequency of a primary component carrier served by the primary cell and a second frequency of a secondary component carrier served by one of the secondary cells for the UE based on the signal quality measurements of the measurements results report; and sending the configuration to the UE, wherein the primary cell transmits first data on the first component carrier to the UE and the secondary cell transmits second data on the second component carrier to the UE;

sending a list of potential secondary cells to the UE, the list being based on a coverage area associated with the second frequency.

12. The method of claim 11, further comprising:
informing the one of the secondary to allocate appropriate resources for the UE to access the secondary component carrier.

13. The method of claim 11, further comprising:
preparing the secondary cells for a handover.

14. The method of claim 11, further comprising:
generating a list of the secondary cells; and transmitting the list to the UE.

15. The method of claim 14, wherein the list includes a cell ID and absolute radio-frequency channel numbers for each of the secondary cells.

16. The method of claim 11, wherein the primary cell is an evolved Node B (eNB) of a Long Term Evolution (LTE) network.

17. The method of claim 11, wherein the primary cell informs the one of the secondary cells to allocate resources on the second component carrier via an X2 interface between the primary cell and the one of the secondary cells.

* * * * *